United States Patent [19]
Mundy

[11] Patent Number: 6,163,506
[45] Date of Patent: Dec. 19, 2000

[54] METHOD AND APPARATUS FOR MANAGING TIMER OBJECTS IN AN EVENT DRIVEN SYSTEM

[75] Inventor: Paul Mundy, Winchester, United Kingdom

[73] Assignee: International Business Machines Corporation, Armonk, N.Y.

[21] Appl. No.: 09/225,460

[22] Filed: Jan. 6, 1999

[30] Foreign Application Priority Data

Oct. 17, 1998 [GB] United Kingdom .................. 9822765

[51] Int. Cl.[7] ............................. G04B 47/00; G06F 1/14
[52] U.S. Cl. ................................. 368/10; 713/502
[58] Field of Search ........................ 368/10, 107–109; 395/500.4; 792/176–178; 713/502

[56] References Cited

U.S. PATENT DOCUMENTS

| | | | |
|---|---|---|---|
| 5,652,789 | 7/1997 | Miner et al. ............................. | 379/201 |
| 5,754,779 | 5/1998 | Dolin, Jr. et al. ....................... | 395/200 |
| 5,908,470 | 6/1999 | Stonecypher, Jr. ...................... | 713/502 |
| 5,969,715 | 10/1999 | Doughgerty et al. .................... | 345/327 |

OTHER PUBLICATIONS

IAC Access No. 01425666 & Data Based Advisor, v9, n1, p110(5), Jan. 1991, Unruh R, "The DESQview library for Clipper".

www–public.rz.uni–duesseldorf.de/~beursken/tutor/c5.htm, "Timers and timer events", as last modified Aug. 23, 1998.

*Primary Examiner*—Vit Miska
*Attorney, Agent, or Firm*—Stephen C. Kaufman

[57] ABSTRACT

Timer objects in an event driven data processing system define expiring times at which a timer event will be generated to trigger data processing actions. According to the invention, such timer objects are managed by, in response to definition of each timer object, storing each said object in secondary storage and, if its expiring time occurs within a predetermined interval, also storing each such timer object in main memory of the data processing system. The expiry times of timer objects are periodically scanned and any currently to expire within the predetermined interval are stored in main memory.

18 Claims, 3 Drawing Sheets

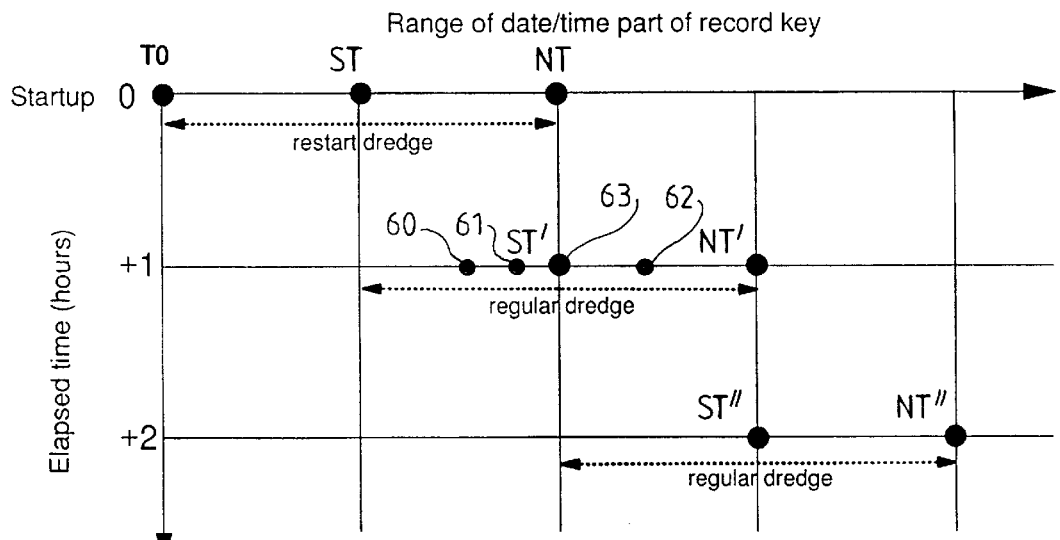
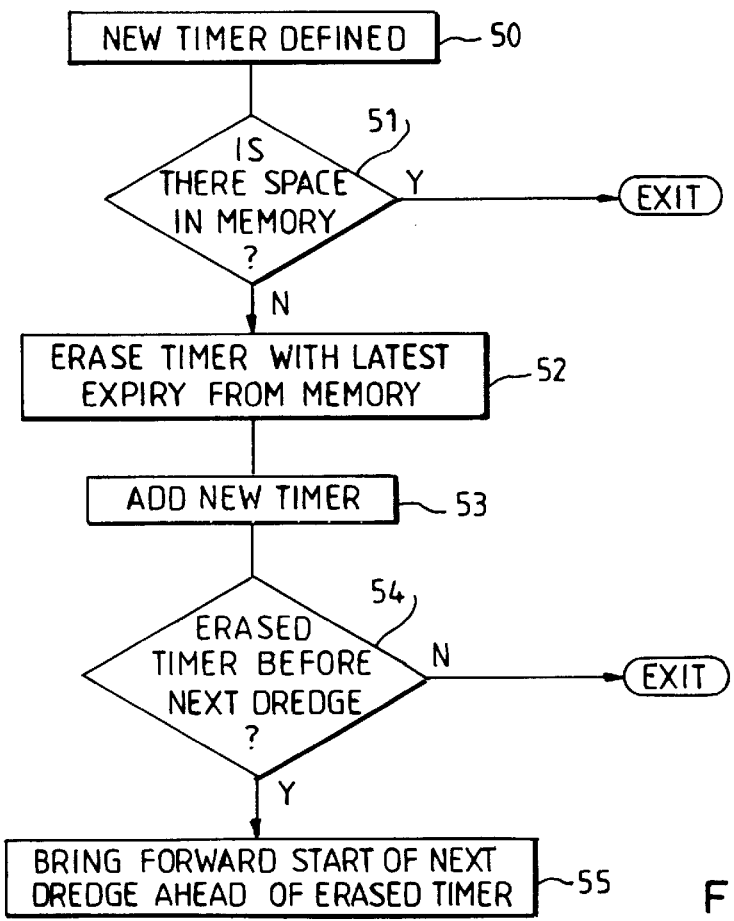

METHOD AND APPARATUS FOR MANAGING TIMER OBJECTS IN AN EVENT DRIVEN SYSTEM

BACKGROUND OF THE INVENTION

The present invention relates to the management of timer objects in an event driven data processing system.

Many data processing activities, such as transaction processing, are caused to progress by means of predefined events which trigger actions in the system. The more complex the system becomes, the greater is the number of events which have to be handled.

A very common type of event is a timer event which occurs at a predetermined absolute time or at the end of a predetermined interval. Such events must be defined to the system as timer objects which specify, directly or indirectly, the time at which the associated event is "fired". This time is also an expiry time for the event, after which the associated timer object should be deleted from storage.

One type of system in which an enormous number of timer objects may be required to define times from a few seconds to many months is in the processing of long-running business transactions. These may, for example, deal with the processing of an order and the manufacture, dispatching, invoicing and receipting for a product or service. In the service case, different aspects may be required from different providers, as in the case of a travel agency service, and the providers may respond at very different rates.

If the number of timer objects is large, it may become impractical to hold them all in main memory, because of memory size restrictions. Also, there may be restrictions on the range of times and dates which can be processed in main memory.

SUMMARY OF THE INVENTION

Accordingly, the present invention provides a method of managing timer objects in an event driven data processing system, said timer objects defining expiry times at which a timer event will be generated to trigger data processing actions, said method comprising in response to definition of each timer object, storing each said object in secondary storage and, if its expiry time occurs within a predetermined interval, also storing each timer object in main memory of the data processing system; and periodically scanning timer object expiry times in secondary storage and storing in main memory any timer objects currently due to expire within the predetermined interval.

In this way, only those timer objects which are nearing their expiry times are brought into main memory.

The invention also provides apparatus for managing timer objects in an event driven data processing system and a computer program for carrying out the method of the invention.

Preferably, the predetermined interval is longer than the interval between periodic scans. This ensures timer objects are brought into memory in good time.

Preferably, said predetermined interval is defined by adding a dredging interval to the current time, said interval being reset after every examination step.

It is also possible, if desired, to maintain a count of the number of timer objects in main memory and to adjust the dredging interval to keep the number below a predetermined maximum.

If there is an absolute restriction on the number of timer objects permitted in main memory, a timer object may be erased from main memory to external storage in response to definition of a new timer object, if the new timer object has an earlier expiry time than that of the object to be displaced. In this case, if the erased timer object has an expiry time before the next periodic scan is due, the scanning step should be brought forward to a time ahead of the erased object expiry time.

Although, in the preferred form of the invention, all timer objects are stored in secondary storage, this is not absolutely necessary and only those with expiring times greater than the predetermined interval need be stored.

BRIEF DESCRIPTION OF THE DRAWINGS

The present invention will now be described, by way of example only, with reference to a preferred embodiment thereof as illustrated in the accompanying drawings, in which:

FIG. 4 is a timing diagram showing how timer objects are progressively moved into main memory.

DETAILED DESCRIPTION OF THE INVENTION

The environment in which the preferred embodiment of the invention is implemented is in a system for processing long running business transactions. A business transaction is a self-contained business deal of which purchasing a vacation is an example. This may involve multiple actions by a travel agent over an extended period involving, for example, flight bookings, hotel reservations, car reservations, invoicing and payment processing. Although the transaction is viewed by agent and customer as a single whole, it is in fact a series of individual actions which take varying lengths of time, may be optional or may be susceptible to failure.

Traditional transaction processing is not well suited to dealing with such long running transactions because the "transactions" with which it operates are short discrete data processing actions consisting of one or more units of work which, in order to ensure recoverability in the case of failure, have to maintain locks on resources while they are in process. Holding locks for extended periods would not be feasible because system performance would suffer or the system would deadlock.

Figure 1:
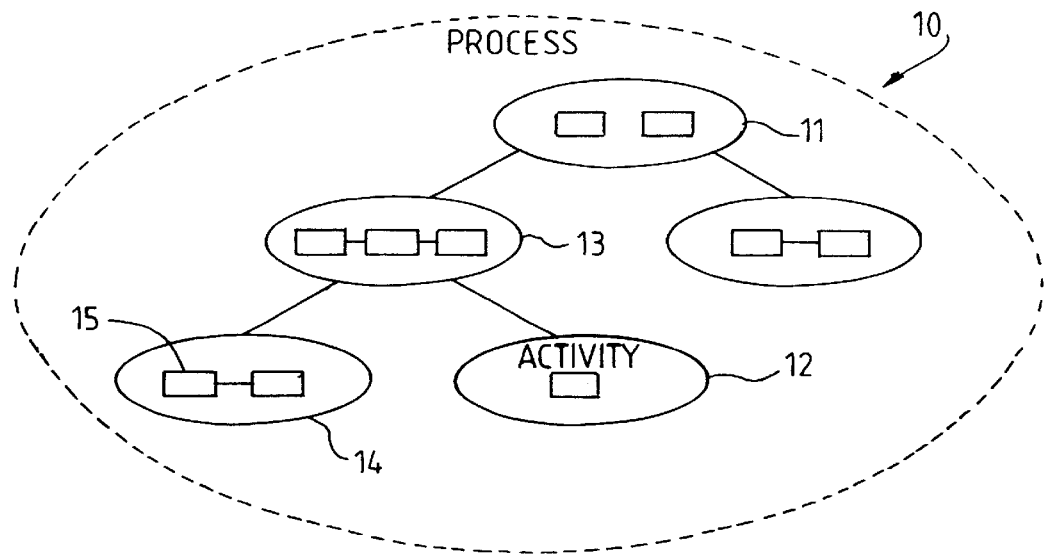
FIG. 1 is an overview of an event driven system for processing activities forming part of a long running business transaction.

However, traditional transactions can be used as building blocks in the execution of a long-running business transaction by a Business Transaction Service (BTS), the structure of which is shown in FIG. 1.

Activities

In the BTS, an initial request starts a Process 10 corresponding to the entire business transaction. The process 10 consists of a collection of Activities which are the basic units of BTS execution. Activities can be hierarchically organized, in a tree structure. An activity 13 that starts another activity is known as a parent activity. An activity 14 that is started by another is known as a child activity. A root activity 12 is always at the top of an activity tree. A process always contains a root activity. When a process is started, the program that implements its root activity receives control. Typically, a root activity is a parent activity that creates and controls a set of child activities—that is, it manages their ordering, concurrent execution, and conditional execution. A root activity also controls synchronization, parameter passing and saving of state data. Within each activity may be traditional short lived transactions 15, such as are processed by the CICS family of transaction servers from IBM (CICS is a registered trademark of International Business Machines Corporation).

To complete its entire work, an activity may need to execute as a sequence of separate processing steps, or activations. For example, a parent activity typically needs to execute for a while, finish execution temporarily, then continue execution when one of its children has completed.

Each activation is "triggered" by a BTS event, and consists of a single transaction 15. A BTS event is a means by which BTS signals progress in a process. It informs an activity that an action is required or has completed. "Event" is used in its ordinary sense of "something that happens". An activity's first activation is triggered by a system event supplied by BTS after the first RUN or LINK command is issued against the activity. When the last activation ends, the activity completion event is "fired", which may, in turn, trigger another activity's activation.

A named area of storage, associated with a particular process or activity, and maintained by BTS is known as a data container. Each process or activity can have any number of data—containers. They are used to hold state data, and inputs and outputs for the activity.

A timer (not shown in FIG. 1), is a BTS object that expires when the system time becomes greater than a specified date and time, or after a specified period has elapsed. Each timer has an event associated with it. The event occurs ("fires") when the timer expires. A timer can be used, for example, to cause an activity to be invoked at a particular time in the future.

Thus, within the BTS, activities, data containers and timers are used to manage many business transactions (processes), record the current status of each business transaction and ensure that each activity is invoked at the appropriate times.

An activity is always in one of the following processing states or modes:

"Active"

An activation of the activity is running.

"Cancelling"

The activity is waiting to be cancelled (a CANCEL ACTIVITY command has been issued).

"Complete"

The activity has completed, either successfully or unsuccessfully.

"Dormant"

The activity is waiting for an event to fire its next activation—which could be its first, or a subsequent, activation.

"Initial"

No RUN or LINK command has yet been issued against the activity; or the activity has been reset to its initial state by means of a RESET ACTIVITY command.

Events

As stated above, a BTS event is a means by which CICS business transaction services signal progress in a process. It informs an activity that an action is required or has completed. To define an event it is given a name. An activity program uses such commands as DEFINE INPUT EVENT, DEFINE TIMER, and the EVENT option of DEFINE ACTIVITY to name events about which it wants to be informed.

Named events have Boolean values—FIRED or NOT-FIRED. When first defined, an event has the NOTFIRED value. When an event occurs it is said to fire (that is to make the transition from NOTFIRED to FIRED). An activity can, for example:

Discover the event (or events) whose firing caused it to be reattached (RETRIEVE REATTACH EVENT)

Test whether an event has fired (TEST EVENT).

BTS events can be atomic or composite.

Atomic Events

An atomic event is a single, "low-level" occurrence (which may happen under the control of BTS or outside the control of BTS). There are four types of atomic event:

Input events

Activity completion events

Timer events

System events

Input Events

Input events tell activities why they are being run. A RUN or LINK ACTIVITY command delivers an input event to an activity, and thus activates the activity. (The INPUTEVENT option on the command names the input event and thus defines it to the requestor).

The first time an activity is run, a system event, DFHINITIAL, tells the activity to perform its initial housekeeping. Typically, this involves defining further events for which it may be activated.

An activity must use the RETRIEVE REATTACH EVENT command to discover the event or events that caused it to be activated. On any activation (but typically on its first, when it is invoked with DFHINITIAL), it may use the DEFINE INPUT EVENT command to define some input events for which it can be activated subsequently.

Activity Completion Events

The completion of a child activity (but not a root activity) causes the activity completion event to fire. (The EVENT option on the DEFINE ACTIVITY command names the activity completion event and thus defines it. If EVENT is not specified, the completion event is given the same name as the activity itself).

Timer Events

As explained above, a timer is a BTS object that expires when the system time becomes greater than a specified date and time, or after a specified period has elapsed. When a timer object is defined, a timer event is automatically associated with it. When the timer expires, its associated event fires.

To define a timer, a DEFINE TIMER command is issued. A timer that specifies a date and time that has already passed expires immediately. Similarly, if the requested interval is zero, the timer expires immediately.

To check whether a timer has expired and, if it has, whether it expired normally a CHECK TIMER command is used.

Figure 2:
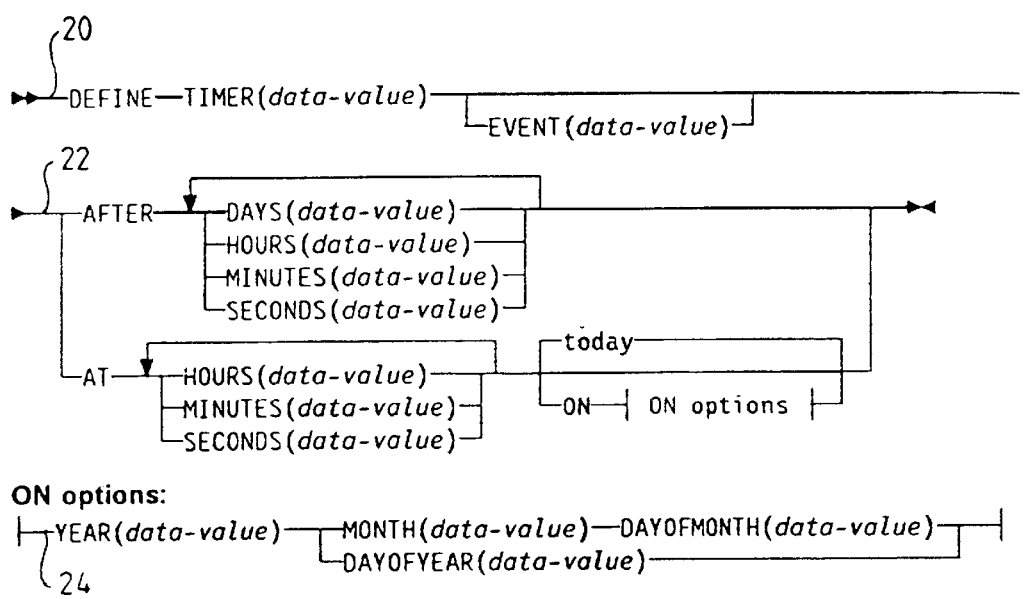
FIG. 2 illustrates the definition of a timer object for triggering a timer event in the system of FIG. 1.

As illustrated in FIG. 2, the DEFINE TIMER command defines a timer object which will expire after a specified interval, or at a specified time and date. When a timer object is defined an associated timer event is also defined. The name of the associated event defaults to the name of the timer object. When the timer object expires, its associated event fires.

It should be noted that all dates and times refer to local time. Also a timer that specifies a time and date that has already passed expires immediately. Similarly, if the requested interval is zero, the timer expires immediately.

The DEFINE TIMER is completed in three phases. In the first phase, 20, a name is selected and entered in the data value field for TIMER. An EVENT name may also be selected but the default is the same name as selected for TIMER. In the second phase, 22, options concerning the time at which the timer event is to fire are selected. Selecting AFTER specifies the interval of time that is to elapse before the timer is to expire, after which the number of DAYS (0–99), HOURS (0–23), MINUTES (0–59) are specified.

Alternatively, selecting AT specifies the time at which the timer is to expire. In this case HOURS (0–23, MINUTES (0–59), and SECONDS (0–59) must be specified. This time can be specified to occur "today" or on a later date specified by the ON option in phase 24. Selecting ON specifies the date at which the timer is to expire, as a combination of the YEAR, MONTH, DAYOFMONTH, and DAYOFYEAR options.

As explained above, if the number of timer events is large it becomes impractical to hold all of them in main storage. The broad solution is to store them initially in secondary storage on disk, and then later bring into main storage those timers which are approaching their expiry times. Note that such timers must be brought into main storage well before their expiry time to avoid any possibility of the timer expiring late. In both main and secondary storage, timers will be stored as a doubly linked list to facilitate their removal and insertion.

Figure 3:
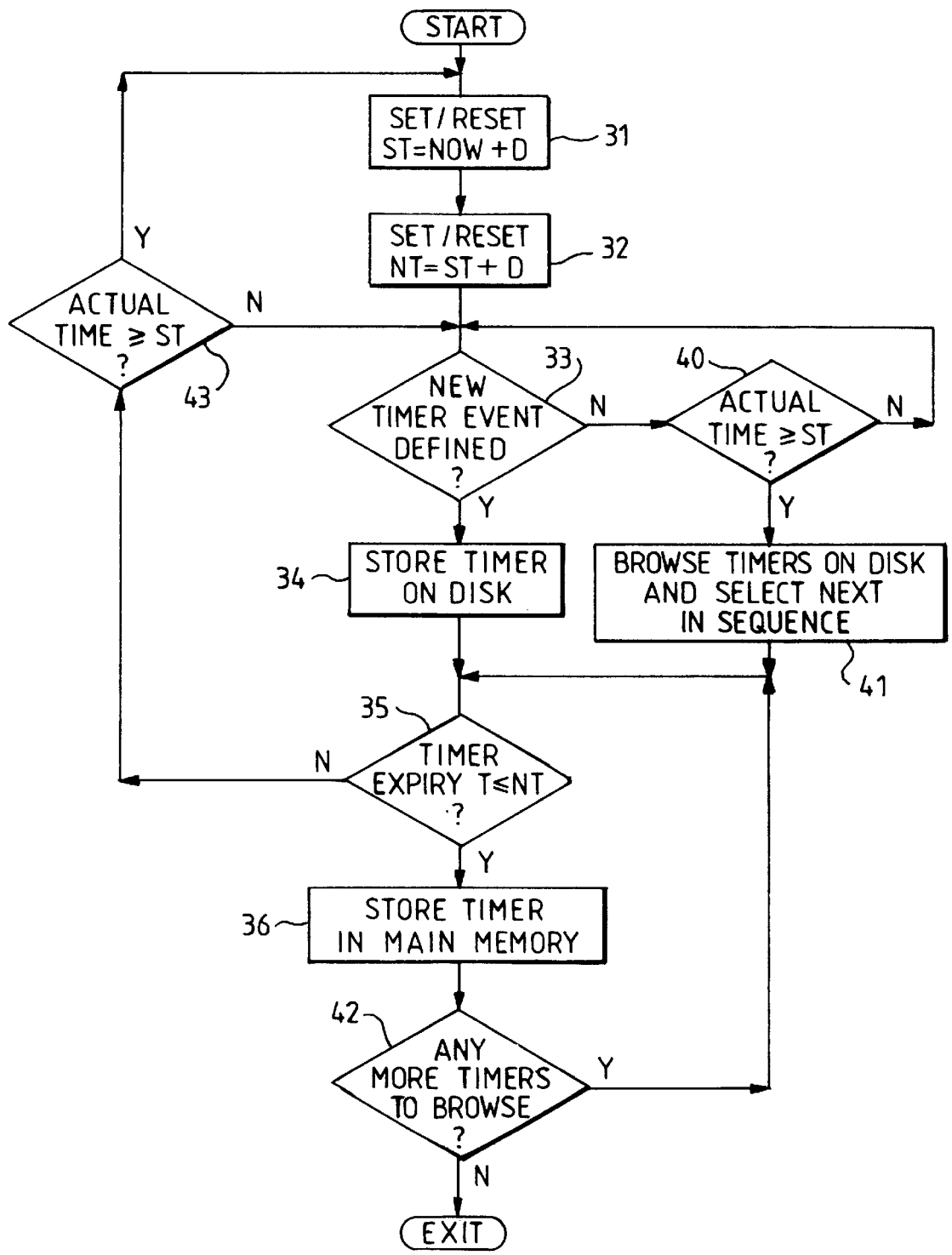
FIG. 3 is a flow diagram illustrating the management of timer objects according to the invention.

The simplest version of this solution is described below and illustrated in the flow diagram of FIG. 3 and timing chart of FIG. 4. Initially, a variable NT, which is known as the 'near-in' time is defined. A variable ST, which is the time at which a system task, known as "dredging", will next run, is also defined. Initially, ST and NT are set in steps 31 and 32:

ST=now+D

NT=ST+D where "now" is the current time and D is a fixed period known as the dredging interval.

Whenever a new timer event is defined (step 33) it is stored on disk (step 34). If it is due to expire at time T at or before NT (step 35), it is immediately stored in main memory as well (step 36). If the actual time is greater than or equal to ST (step 40), the dredging task runs. It scans the disk file in step 41 and brings into storage (steps 35 and 36) any timers which are now due to expire by time NT. If there are no more timers to browse (step 42), an exit is taken. Otherwise steps 35 and 36 are repeated.

If, in step 35, it is determined that the timer being examined does not expire before NT, then a test is made at step 43 to see if the time ST to run to dredging task has been reached. It is has, ST and NT are reset by steps 31 and 32 as follows (before the disk file is scanned):

ST=now+D

NT=ST+D

FIG. 4 shows how the resetting of ST and NT at periodic intervals, D, shifts the range of the date/time part of the timer objects' record keys progressively with elapsed time to bring a new tranche of timer objects into main storage.

The above design limits the timers that are in storage to those which are due to expire within twice the dredging interval. However, if the dredging interval is too large, these timers may consume more storage that is desired or available. A way round this, according to an alternative embodiment of the invention, is to keep track of the current number of timers in storage, and compare this number with a desired maximum number of timers. This information can then be used to make dynamic adjustments (up or down) to the dredging interval D (and also NT and ST).

Furthermore, if there is an absolute storage limit for timers, the design can be further modified such that a newly defined timer would, if necessary, displace an existing timer which had a later expiry time. At this point, it may be necessary to cause the dredging task to run before the expiry time of the displaced timer.

FIG. 5 shows how this could be implemented. Whenever a new timer is defined at step 50, a check is made in step 51 as to whether there is space in memory. If there is not, then the timer in memory with the latest expiring time is erased in step 52 and the new timer added in step 53. By way of example the new timer could expire at point 60 in FIG. 4 and the erased timer could be due to expire at either point 61 or point 62. If the erased timer is due to expire before the next dredge ST' at point 63, as would be the case with timer 61, then the next dredge should be brought forward to a point between 60 and 61. If the erased timer is later than the next dredge, as in the case of timer 62, no action is necessary. This is tested in step 54 and the dredge brought forward in step 55 if necessary. If these additional steps were not carried out, it would be possible for an erased timer object, such as 61, never to be brought back into memory.

What is claimed is:

1. A method of managing timer objects in an event driven data processing system, said timer objects defining expiry times at which a timer event will be generated to trigger data processing actions, said method comprising in response to definition of each timer object, storing each said object in secondary storage and, if its expiry time occurs within a predetermined interval, also storing each timer object in main memory of the data processing system; and periodically scanning timer object expiry times in secondary storage and storing in main memory any timer objects currently due to expire within the predetermined interval.

2. A method as claimed in claim 1 in which the predetermined interval is longer than the interval between said periodic scans.

3. A method as claimed in claim 1 in which said predetermined interval is defined by adding a dredging interval to the current time, said interval being reset after every scanning step.

4. A method as claimed in claim 3 including the further step of maintaining a count of the number of timer objects in main memory and adjusting the dredging interval to keep the number below a predetermined maximum.

5. A method as claimed in claim 1 in which only a predetermined maximum number of timer objects is permitted in main memory, comprising the further step of erasing a timer object from main memory in response to definition of a new timer object, if the newly defined object has an expiry time earlier than that of the object to be displaced.

6. A method as claimed in claim 5 in which, if said erased timer object has an expiry time before the next periodic scan is due, said scanning step is brought forward to a time ahead of said erased object expiry time.

7. Apparatus for managing timer objects in an event driven data processing system, said timer objects defining expiry times at which a timer event will be generated to trigger data processing actions, said apparatus comprising storing means responsive to definition of a timer object to store each said object in secondary storage and, if its expiry time occurs within a predetermined interval, to store each such timer object in main memory of the data processing system; and scanning means for periodically scanning timer object expiry times in secondary storage and storing in main memory any timer objects currently due to expire within the predetermined interval.

8. Apparatus as claimed in claim 7 in which the predetermined interval is longer than the interval between said periodic scans.

9. Apparatus as claimed in claim 7 further including means for defining said predetermined interval by adding a dredging interval to the current time, said interval being reset after every operation of said scanning means.

10. Apparatus as claimed in claim 9 further including counter means for maintaining a count of the number of timer objects in main memory and adjusting the dredging interval to keep the number below a predetermined maximum.

11. Apparatus as claimed in claim 7 in which only a predetermined maximum number of timer objects is permitted in main memory further comprising means for erasing a timer object from main memory in response to definition of a new timer object, if the newly defined object has an expiry time earlier than that of the object to be displaced.

12. Apparatus as claimed in claim 11 in which, if said erased timer object has an expiry time before the next periodic scan is due, said scanning means is caused to operate ahead of said erased object expiry time.

13. A computer program product recorded on a medium for carrying out a method of managing timer objects in an event driven data processing system, said timer objects defining expiry times at which a timer event will be generated to trigger data processing actions, said method comprising in response to definition of each timer object, storing each said object in secondary storage and, if its expiry time occurs within a predetermined interval, also storing each timer object in main memory of the data processing system; and periodically scanning timer object expiry times in secondary storage and storing in main memory any timer objects currently due to expire within the predetermined interval.

14. A computer program product as claimed in claim 13 in which the predetermined interval is longer than the interval between said periodic scans.

15. A computer program product as claimed in claim 13 in which said predetermined interval is defined by adding a dredging interval to the current time, said interval being reset after every scanning step.

16. A computer program product as claimed in claim 15 in which said method includes the further step of maintaining a count of the number of timer objects in main memory and adjusting the dredging interval to keep the number below a predetermined maximum.

17. A computer program product as claimed in claim 13 in which only a predetermined maximum number of timer objects is permitted in main memory, said method comprising the further step of erasing a timer object from main memory in response to definition of a new timer object, if the newly defined object has an expiry time earlier than that of the object to be displaced.

18. A computer program product as claimed in claim 17 in which, if said erased timer object has an expiry time before the next periodic scan is due, said scanning step of said method is brought forward to a time ahead of said erased object expiry time.

* * * * *